United States Patent
Honda et al.

(10) Patent No.: US 6,574,453 B1
(45) Date of Patent: Jun. 3, 2003

(54) RESPONSE DETERMINATION METHOD, COMMUNICATION METHOD, AND WIRELESS TRANSCEIVER

(75) Inventors: Ryoji Honda, Saitama-ken (JP); Akira Tanamura, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,344

(22) Filed: Sep. 15, 1999

(30) Foreign Application Priority Data

Oct. 22, 1998 (JP) .......................................... 10-300703

(51) Int. Cl.⁷ ............................................... H04B 7/15
(52) U.S. Cl. ....................................................... 455/11.1
(58) Field of Search ..................... 455/11.1, 7; 370/252, 370/328, 338

(56) References Cited

U.S. PATENT DOCUMENTS

| | | | | |
|---|---|---|---|---|
| 2,883,522 A | * | 4/1959 | Brosh .................. | 343/700 MS |
| 5,552,798 A | * | 9/1996 | Dietrich et al. ............. | 370/342 |
| 5,655,002 A | * | 8/1997 | Proctor et al. ............... | 370/229 |
| 5,724,665 A | * | 3/1998 | Abbasi et al. ................ | 455/18 |
| 6,327,245 B1 | * | 12/2001 | Satyanarayana et al. .... | 329/300 |

FOREIGN PATENT DOCUMENTS

| | | | | |
|---|---|---|---|---|
| JP | 8102708 | | 4/1996 | ............ H04B/7/26 |
| JP | 08102708 | * | 4/1996 | ............ H04B/7/26 |
| JP | 8275245 | | 10/1996 | ............ H04Q/7/38 |
| JP | 9252277 | | 9/1997 | ............ H04B/7/26 |
| JP | 10032538 | | 2/1998 | ............ H04B/7/26 |

* cited by examiner

*Primary Examiner*—Nguyen T. Vo
*Assistant Examiner*—David Q. Nguyen
(74) *Attorney, Agent, or Firm*—Jeanine S. Ray-Yarletts (57) ABSTRACT

According to the present invention, a wireless transceiver on a reception side performs the steps of: measuring a radio strength of a radio signal received from another wireless transceiver; and by using the measured radio strength and a response policy concerning radio strength, determining the response timing to the received radio signal. A wireless transceiver on a transmission side performs the steps of: specifying a response policy concerning a radio strength for other wireless transceivers that will receive a radio signal; and transmitting to the wireless transceiver a radio signal including the specified response policy. As a result, a wireless transceiver located in an area where the wireless transceiver on the transmission side can be connected can be specified.

4 Claims, 6 Drawing Sheets

AT1 ... ANTENNA
CR1 ... MOBILE OBJECT
DS1 ... DISPLAY DEVICE
GP1 ... GPS
IP1 ... INPUT DEVICE
MM1 ... MEMORY
MS1 ... TRAFFIC INFORMATION MESSAGE
MS6 ... MAIL INFORMATION MESSAGE
RX1 ... LOW RADIO RECEIVER
TX1 ... LOW RADIO TRANSMITTER

FIG. 3

CR1,CR2 ............... MOBILE OBJECT
DS1,DS2 ............... DISPLAY DEVICE
MS1,MS2,MS2-2 .... TRAFFIC INFORMATION MESSAGE
MS6 ....................... MAIL INFORMATION MESSAGE

RESPONSE DETERMINATION METHOD, COMMUNICATION METHOD, AND WIRELESS TRANSCEIVER

BACKGROUND

Japanese Published Unexamined Patent Application No. Hei 9-252277 includes the following description (see FIG. 1): "Information transmits by a base station is received by mobile station A, . . . , and after processing is performed by mobile station A, the information is relayed to mobile station B. The information is relayed in turn to mobile stations B, C and D. By relaying information in this manner, only a small amount of electric power is required to transmit information across a wide range." In this application, a re-transmission counter value included in a transmission frame is incremented by one each time the information is relayed, and whether an information relay process should be performed is determined in accordance with the re-transmission counter value. The above publication states that by using this method information can be transmitted locally. However, a problem will arise if whether a relay is to be performed is determined in accordance with the number of relays that were performed previously. For example, when mobile wireless stations that are close together relay information to each other, the number of relay operations performed may reach the limit before information has not been delivered to an area far from the base station. In addition, no countermeasures are provided for the congestion that frequently occurs in communications conducted among an increased number of mobile wireless stations.

Furthermore, Japanese Published Unexamined Patent Application No. Hei 10-32538 includes the following description (see FIG. 2): "While running, a mobile object CR1 obtains its current position and the current time from a GPS device GP1. Based on these data, the current running path (route) and the average speed, the time required and the traffic level along the route are obtained and stored as traffic information message MS1 in a memory MM1." In addition, the following description is given referring to FIG. 3: "Assume that mobile objects CR1 and CR2 move toward each until they are at a communicable distance. The mobile object CR2 transmits to the mobile object CR1 traffic information message MS2-2, which is stored in the object CR2. The mobile object CR1 transmits to the mobile object CR2 traffic information message MS1, which is processed by the object CR1, and mail information message MS6, which is addressed to a destination computer. Of the traffic information message MS1 received by the mobile object CR2, the important portion concerning the mobile object CR2 is displayed as the latest arrived information by a display device DS2. Similarly, of the traffic information message MS2-2 received by the mobile object CR1, the important portion concerning the mobile object CR1 is displayed as the latest arrived information by a display device DS1." Furthermore, there is the following description in the above application: "Essentially, the message transmission system in this embodiment does not ensure the arrival of data, and the rate of data arrival must be increased as much as possible . . . . . Actually, since many mobile objects run in the same area, traffic information data for a specific area/route are sequentially updated to the most recently happened data. Particularly in a country like Japan where traffic jams often occur, a mobile object is always present in the vicinity of another mobile object, so that essentially a message can be exchanged at substantially the same high speed and in the same wie range as are those for a wired network." Moreover, it is stated in the above application that since an instant message need not be transmitted across a wide range, it is immediately erased instead of being stored for a long time. However, there is no specific explanation concerning a method for determining how instant a message is and for determining the time at which to erase an instant message. In addition, there is no description of the problem that arises when multiple mobile wireless stations are present locally.

OBJECTS OF THE INVENTION

In the above conventional art, a mechanism is disclosed for the exchange by mobile wireless stations of information received from a base station. However, it is stated that the processing performed by a mobile station when transmitting information is controlled only by using the number of relays that are affected. It is, therefore, one object of the present invention to provide a method for information transmission control having a more adequate form.

It is one more object of the present invention to avoid congestion of information.

It is another object of the present invention to transmit information more efficiently.

SUMMARY OF THE INVENTION

To achieve the above objects, according to the present invention, a wireless transceiver on a reception side performs the steps of: measuring a predetermined property (e.g., a radio strength) of a radio signal received from another wireless transceiver; and by using the measured predetermined property and a corresponding response policy (e.g., a response policy concerning radio strength), determining the response timing to the received radio signal. The predetermined property includes a physical property, and the response policy may be one that is stored internally, or one that is extracted from the received radio signal.

If the measured radio strength satisfies a condition designated by the response policy, the response timing can be set for an earlier time following the receipt of a radio signal than in a case where the condition is not satisfied. When a specific wireless transceiver responds to a radio signal more quickly than does another wireless transceiver, the probability of establishing a connection is increased. Therefore, the probability is increased that a connection will be established between wireless transceivers that matches the response policy.

In particular, if a response policy designates a radio strength equal to or less than a predetermined level and if the measured radio strength is equal to or less than the predetermined level, the response timing can be set for an earlier time following the receipt of a radio signal than in a case where the measured radio strength exceeds the predetermined level. Therefore, the probability will increase that a wireless transceiver which has transmitted a radio signal will be connected with another wireless transceiver at a relatively distant location.

In addition to the above steps, the following steps may be executed: checking the communication history with another wireless transceiver that has transmitted the radio signal; and if the communication history shows that within a predetermined period of time there is a communication with another wireless transceiver, determining that no response to the radio signal will be sent. This occurs because the communication efficiency of the overall system is reduced if, for the exchange of similar information, a specific wireless transceiver is repeatedly connected to the same wireless transceiver within a short period of time.

A wireless transceiver on a transmission side performs the steps of: specifying a response policy concerning a radio strength for other wireless transceivers that will receive a radio signal; and transmitting to other wireless transceivers a radio signal including the specified response policy. As a result, a wireless transceiver on a transmission side can specify a wireless transceiver that is present in an area where the transmitting wireless transceiver desires to establish a connection. That is, in accordance with the response policy a wireless transceiver located at a predetermined distance can be specified.

The response policy can be based either on a radio strength level, or on the range of a radio strength value. In addition, the radio signal which includes the specified response policy can include a terminal mode indicating whether a wireless transceiver on the transmission side only transmits or not. If the wireless transceiver on the transmission side is a base station, it does not need to receive information from a wireless transceiver on the receiving side so long as the terminal mode is included in the radio signal.

The response policy can be changed in accordance with a predetermined condition. If, for example, the wireless transceiver on the transmission side is in an area where a probability is high that multiple other wireless transceivers are located, a low radio strength can be set. But if the wireless receiver on the transmission side is in an area where only a few other wireless transceivers are located, a high radio strength can be set. Further, the radio strength level can repeatedly be switched to low, to high or to intermediate each time a predetermined period has elapsed.

The present invention has been explained as a process performed by a wireless transceiver. But in addition, the present invention can be implemented as a wireless transceiver that has components for performing the individual steps. These steps can be implemented by a program to be executed by a processor included in a wireless transceiver. This program is stored in a storage device, such as a ROM (Read Only Memory). The program may also be stored on a storage medium, such as a hard disk.

DETAILED DESCRIPTION OF THE PREFERRED EMBODIMENT

Figure 1:
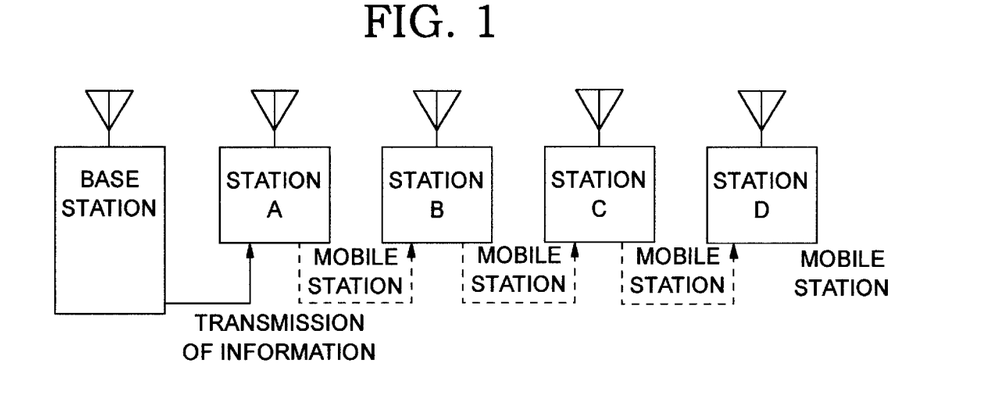
FIG. 1 is a diagram illustrating the premise of the conventional art and of the present invention.
Figure 2:
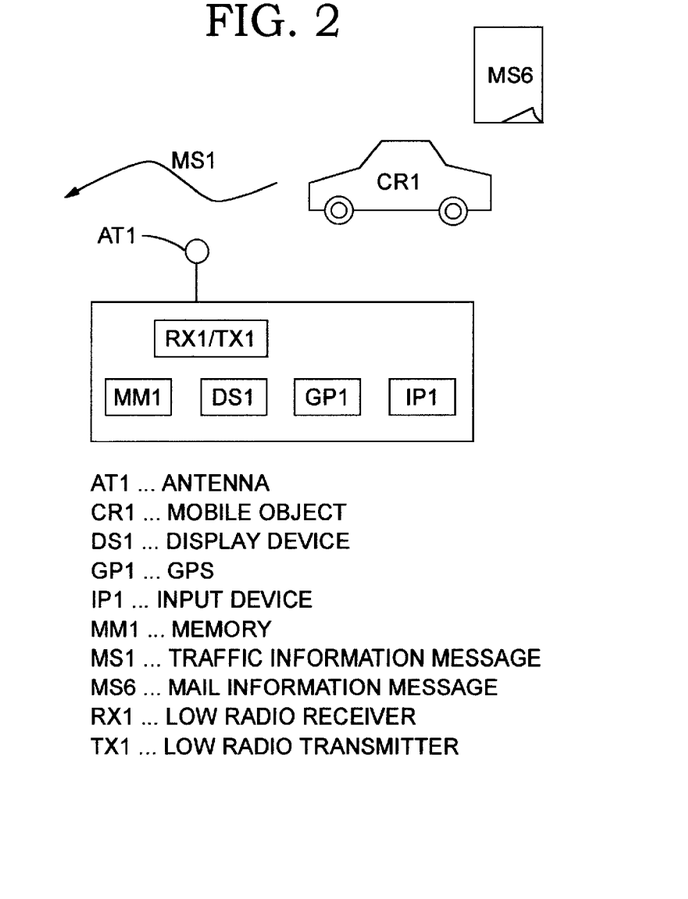
FIG. 2 is a diagram illustrating the premise of the conventional art and of the present invention.
Figure 3:
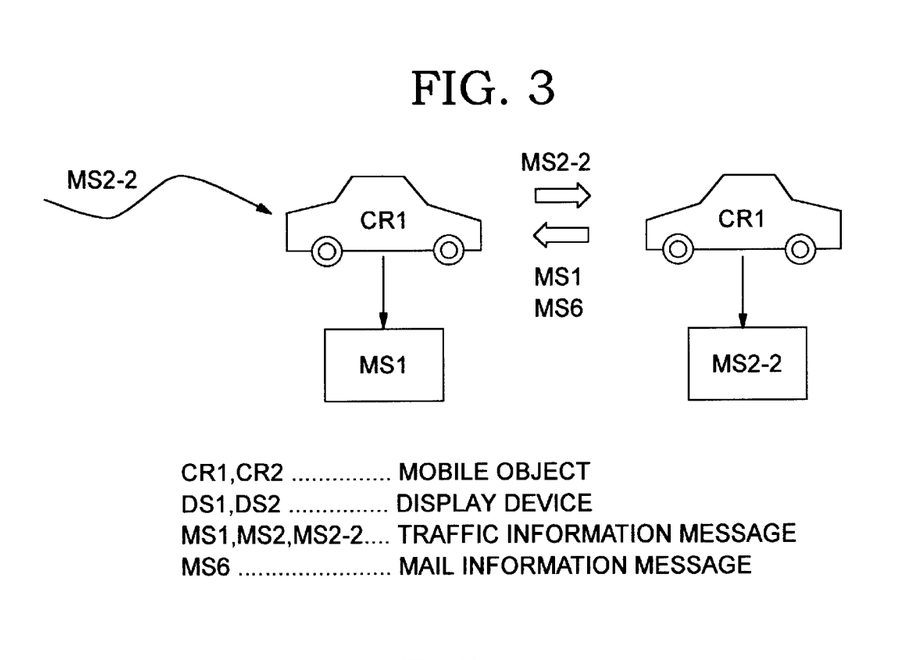
FIG. 3 is a diagram illustrating the premise of the conventional art and of the present invention.

As described above, the premise of the present invention is that information (including a program) originating at a base station will be transmitted by hopping from mobile station to mobile station, as shown in FIGS. 1 to 3. It should be noted that an information transmission source is not limited to a base station, and that a mobile wireless station can serve as a transmission source. An explanation will now be given for the configuration of a mobile wireless station, communication between mobile stations, and the processing performed by a mobile station, all of which are features of the present invention.

(1) Configuration of Mobile Wireless Station

Figure 4:
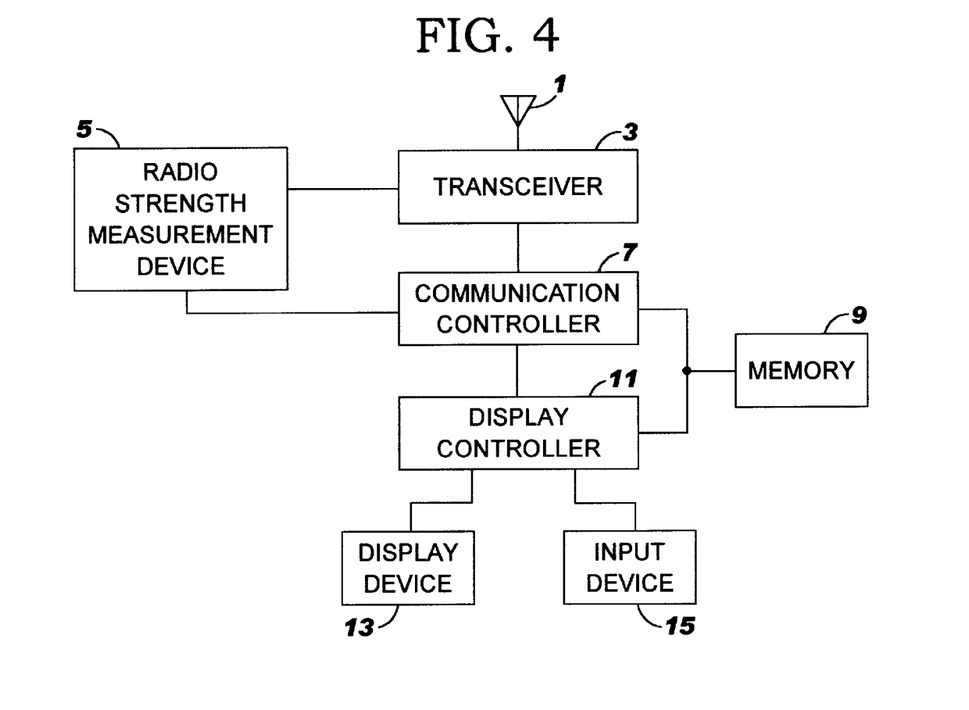
FIG. 4 is a block diagram showing an example configuration of a mobile wireless station according to the present invention.

FIG. 4 is a block diagram illustrating an example wireless transceiver configuration for a mobile wireless station. A transceiver 3 is connected to an antenna 1, and is also connected to a communication controller 7 and to a radio strength measurement device 5, which is also connected to the communication controller 7. The communication controller 7 is further connected to a memory 9 and to a display controller 11. The display controller 11 is also connected to the memory 9 and to a display device 13 and an input device 15. The wireless transceiver also includes a timer (not shown).

The transceiver 3 converts a radio signal received at the antenna 1 into an electric signal for the transmission of necessary information to the communication controller 7. The electric signal is also output to the radio strength measurement device 5. The radio strength measurement device 5 measures the radio strength of the radio signal received by the transceiver 3, and outputs it to the communication controller 7. Since a CDMA (Code Division Multi Access) wireless terminal or a PHS (Personal Handyphone System) terminal, for example, includes means for generating an RSSI (Receiving Signal Strength Indicator) signal, therefore this may be employed. If a request for a connection is received by the transceiver 3, the communication controller 7 determines whether a response to the request should be transmitted, or if the request is to be accepted, determines when a response should be issued. In order to respond to the connection request, in addition to preparing information to be transmitted the transceiver 3 also stores in the memory 9 the received information. The display controller 11 reads the data that were received and stored in the memory 9 and that were designated by a user using the input device 15, and displays the data on the display device 13. A communication history that shows with which wireless transceivers communications were performed, together with communication times, is stored in the memory 9. Since a conventional method is employed for managing and maintaining the memory 9, no further explanation will be given.

The communication controller 9 instructs the transceiver 3 to initiate communications in accordance with an adequate timing schedule. To begin the communication process, the transceiver 3 broadcasts a terminal ID and a connection request that includes a response policy, which will be described later, and waits for a connection response from another wireless transceiver. If a connection response is transmitted by another wireless transceiver, the transceiver 3 establishes a connection with that wireless transceiver, and initiates the communication of data. The communication controller 7 extracts from the memory 9 information to be transmitted, while it stores in the memory 9 information it receives. The information to be transmitted is converted into a radio signal by the transceiver 3. The connection request can not only include the above described information, but can also include a terminal mode that specifies whether the wireless transceiver that issued the connection request will only transmit or will both transmit and receive.

A mobile wireless station has the previously described configuration. A base station may have the same configuration as shown in FIG. 4, and may also include a function for communicating with a wired network, such as the Internet or a LAN (Local Area Network), and a sub-storage device for storing such information as advertisements.

Figure 5:
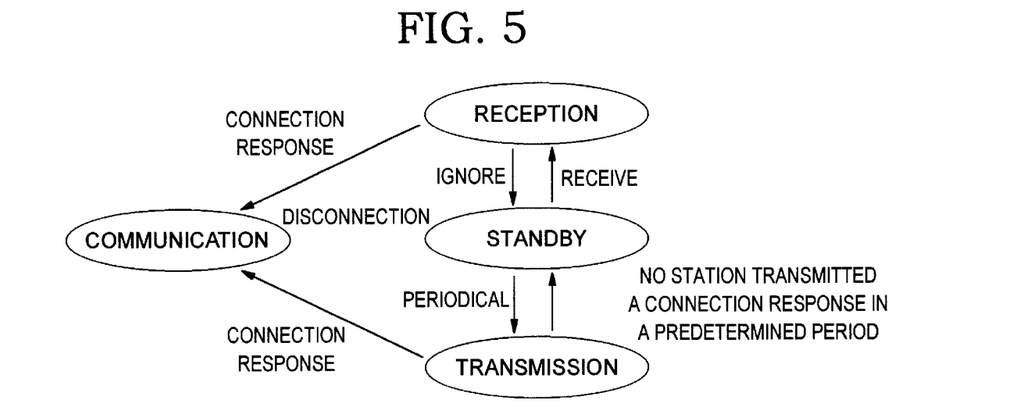
FIG. 5 is a diagram showing the state transition of a wireless transceiver according to the present invention.

FIG. 5 is a diagram showing the state transition of a wireless transceiver, which is normally in a standby state. The communication controller 7 periodically issues an instruction to move to a transmission state in which a connection request is broadcast. Ordinarily, there are many other wireless transceivers which receive the connection request, but if no wireless transceiver transmits a connection response within a predetermined period of time, the wireless transceiver that issued the request is returned to the standby state. If a connection response is received from other wireless transceivers, the wireless transceiver that issued the request establishes a connection with the wireless transceiver that first transmitted a connection response, and shifts to a communication state. When the communication process is completed, the connection is disconnected by the wireless transceiver and it is returned to the standby state. If in the standby state a connection request is received from another wireless transceiver, the wireless transceiver is moved to a reception state. In the reception state, the communication controller 7 determines whether a connection response should be issued to begin the communication process, and determines what the response timing is if a connection response is to be transmitted. If it is determined that a connection response should not be transmitted, it is assumed that the connection request has been ignored and the wireless transceiver returns to the standby state. When it is determined that a connection response should be transmitted, the wireless transceiver shifts to the communication state. When the connection is established, the communication process is performed in the communication state. If a connection can not be established even though the connection response has been transmitted, the wireless transceiver shifts to the communication state once, and is immediately disconnected and returns to the standby state.

(2) Communication Between Mobile Wireless Stations

Figure 6:
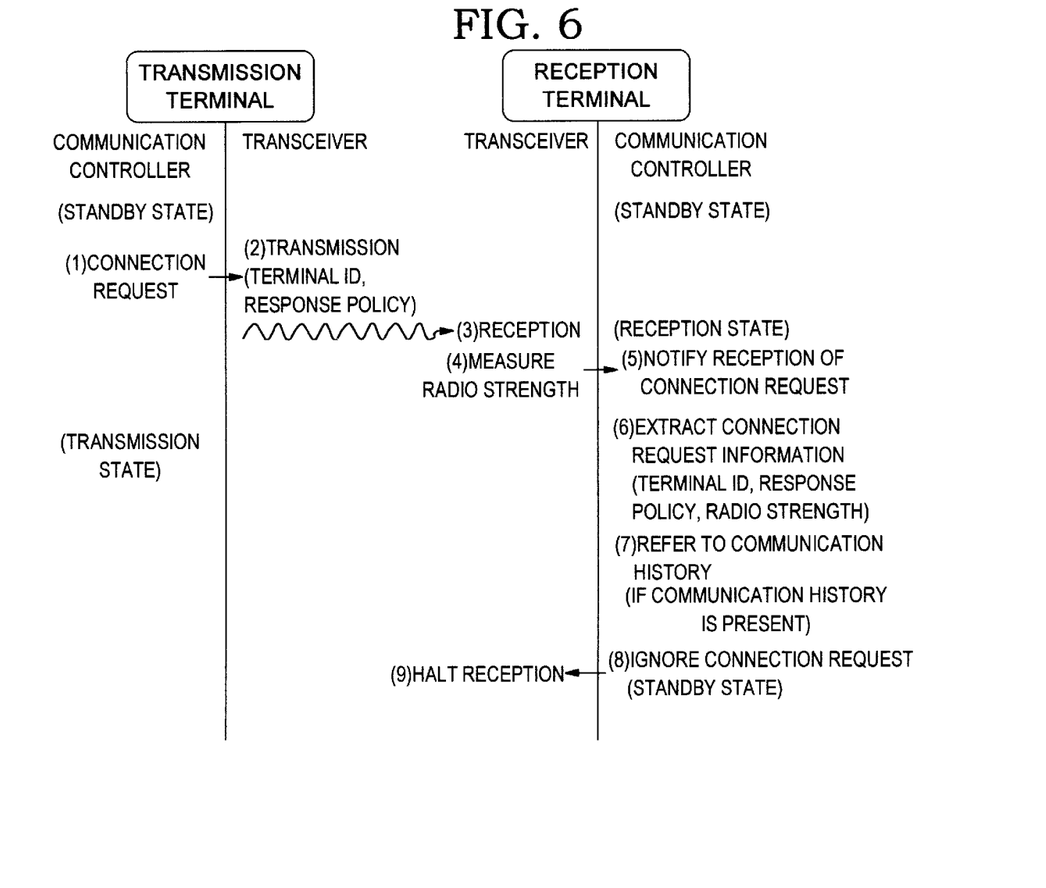
FIG. 6 is a flowchart showing the processing performed to establish communication between a transmission terminal and a reception terminal.
Figure 7:
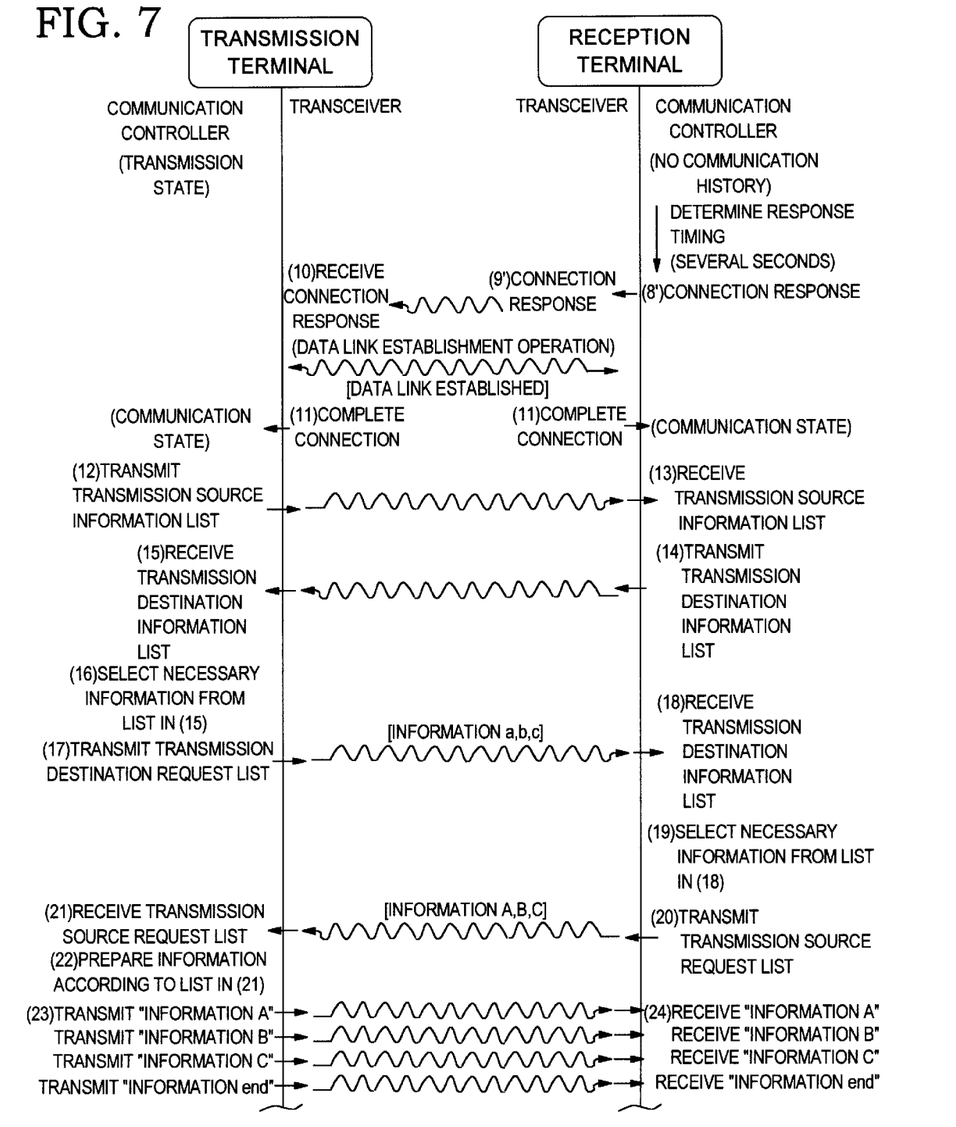
FIG. 7 is a flowchart showing the processing performed to establish communication between the transmission terminal and the reception terminal.

FIGS. 6 and 7 are diagrams showing the communication between a wireless transceiver on the transmission side (hereinafter referred to as a transmission terminal) and a wireless transceiver on the reception side (hereinafter referred to as a reception terminal). First, in the transmission terminal in the standby state, a communication controller 7A (A denotes a component in the transmission terminal, and B denotes a component in the reception terminal) instructs a transceiver 3A to issue a connection request (step (1) in FIG. 6). The communication controller 7A also outputs to the transceiver 3A the ID and the response policy of the transmission terminal. The transceiver 3A broadcasts the connection request which includes the terminal ID and the response policy (step (2)). Since the radio strength measurement device 5 is employed, a response policy concerning a radio strength is designated. In this example, the radio strength may be divided into several levels in advance, and one or more levels may be designated. The range of a radio strength value may also be designated. In the reception terminal, a transceiver 3B receives a radio signal from the transmission terminal (step (3)), and a radio strength measurement device 5B measures the radio strength of the radio signal that is associated with the connection request (step (4)). The transceiver 3B notifies a communication controller 7B that the connection request has been received (step (5)), and outputs thereto the received information. The communication controller 7B extracts connection request information from the received information (step (6)).

The communication controller 7B refers to the communication history using the terminal ID included in the extracted information (step (7)). If within a predetermined period of time (e.g., within five minutes) a response to a connection request has been transmitted to the transmission terminal, the communication controller 7B determines that no response to the current connection request will be replied (step (8)). Therefore, the communication controller 7B outputs to the transceiver 3B a command to ignore the connection request and the transceiver 3B suspends the reception process (step (9)). Thereafter, the reception terminal is shifted to the standby state.

The communication processing performed if a reception terminal does not perform the communication with the same transmission terminal within in predetermined period of time will now be described referring to FIG. 7. If at step (7) in FIG. 6 the reception terminal does not perform the communication with the same transmission terminal within a predetermined period of time, the communication controller 7B determines a response timing in accordance with the response policy and the measured radio strength. The processing for determining the response timing will be described later. In consonance with the determined response timing, the communication controller 7B instructs the transceiver 3B to transmit a connection response (step (8')). Upon receiving the instruction, the transceiver 3B transmits a connection response to the transmission terminal (step (9')). If this is the first connection response to be received, the transceiver 3A accepts it (step (10)) and interacts with the transceiver 3B to establish a data link for the operation. When the data link is established, the transceivers 3A and 3B notify the communication controllers 7A and 7B that the connection has been established (step (11)). The two terminals are then shifted to the communication state.

The communication controller 7A of the transmission terminal instructs the transceiver 3A to transmit a transmission source information list, and the transceiver 3A transmits the list to the transceiver 3B of the reception terminal (step (12)). The transmission source information list is a list of information that is stored and is to be transmitted by the transmission terminal. If a large amount of information is to be transmitted, or if the information required for the terminal is limited, the number of communications that will be required later can be reduced. The transceiver 3B of the reception terminal receives the transmission source information list, and outputs it to the communication controller 7B (step (13)). Thereafter, the communication controller 7B instructs the transceiver 3B to transmit a transmission destination information list, and accordingly, the transceiver 3B transmits that list to the transceiver 3A of the transmission terminal (step (14)). The transceiver 3A in the transmission terminal receives the transmission destination information list and outputs it to the communication controller 7A. From the received transmission destination information list, the communication controller 7A selects that information which is that a user designates using the input device 15A, or information that is not present at the transmission terminal (step (16)). The communication controller 7A causes the transceiver 3A to transmit to the reception terminal the selected information as a transmission destination request list (step (17)).

In this embodiment, the transmission destination request list includes information a, b and c.

At the reception terminal, the transceiver 3B outputs the transmission destination request list to the communication controller 7B (step (18)). The communication controller 7B selects necessary information from the transmission source information list that was received at step (13) (step (19)) and prepares a transmission source request list. The communication controller 7B causes the transceiver 3B to transmit that list to the transmission terminal (step (20)). In this embodiment, the transmission source request list includes information A, B and C. At the transmission terminal, the transceiver 3A receives the transmission source request list and outputs it to the communication controller 7A (step (21)). In accordance with the received transmission source request list, the communication controller 7A extracts necessary information from the memory 9A (step (22)) and causes the transceiver 3A to sequentially transmit information included in the transmission source request list (step (23)). In this embodiment, since information pieces A, B and C are requested, they are sequentially transmitted to the reception terminal. When all the information has been transmitted, a transmission end is transmitted to the reception terminal. At the reception terminal the transceiver 3B receives the information, and the communication controller 7B stores it in the memory 9B (step (24)).

When the transmission end is received, the communication controller 7B extracts necessary information from the memory 9B in accordance with the transmission destination request list that was received at step (18) (step (25)). Then, the communication controller 7B causes the transceiver 3B to sequentially transmit information included in the transmission destination request list (step (26)). In this embodiment, since information pieces a, b and c are requested, the transceiver 3B sequentially transmits them to the transmission terminal. When all the information has been transmitted, a transmission end is output to the transmission terminal. At the transmission terminal, the transceiver 3A receives the information, and the communication controller 7A stores it in the memory 9A (step (27)).

Next, the communication controller 7A outputs a disconnection request to the transceiver 3A (step (28)). The transceiver 3A performs a disconnection operation and interacts with the transceiver 3B to disconnect the data link (step (29)). When this operation is completed, the transceiver 3A notifies the communication controller 7A that the disconnection has been completed, and the transmission terminal is shifted to the standby state (step (30)). Similarly, the transceiver 3B notifies the communication controller 7B that the disconnection has been completed and the reception terminal is shifted to the standby state (step (30')). The communication controllers 7A and 7B update their communication histories by using the terminal IDs and the communication end time (steps (31) and (31')), and prepare for the next information exchange.

FIG. 7 shows the example processing performed to exchange information lists. However, this processing can be so modified that instead of exchanging information lists, the terminals can exchange internally stored information and can abandon unnecessary information that is received. Furthermore, the reception terminal may transmit information first. In addition, the transmission terminal can be so designed that it only transmits information to and does not accept information from the reception terminal. In this case, it is more efficient at step (2) in the processing in FIG. 6 for the transmission terminal to transmit not only the terminal ID and the response policy, but also information (terminal mode data) indicating it will perform only the transmission function. Then, the exchange of the transmission destination information list, the exchange of the transmission destination request list and the transmission of information by the reception terminal to the transmission terminal will not be required in the processing in FIG. 7. The terminal mode can be set for the reception terminal. That is, the reception terminal will be so set that it only receives and does not transmit information.

(3) Processing at Mobile Wireless Station

Figure 8:
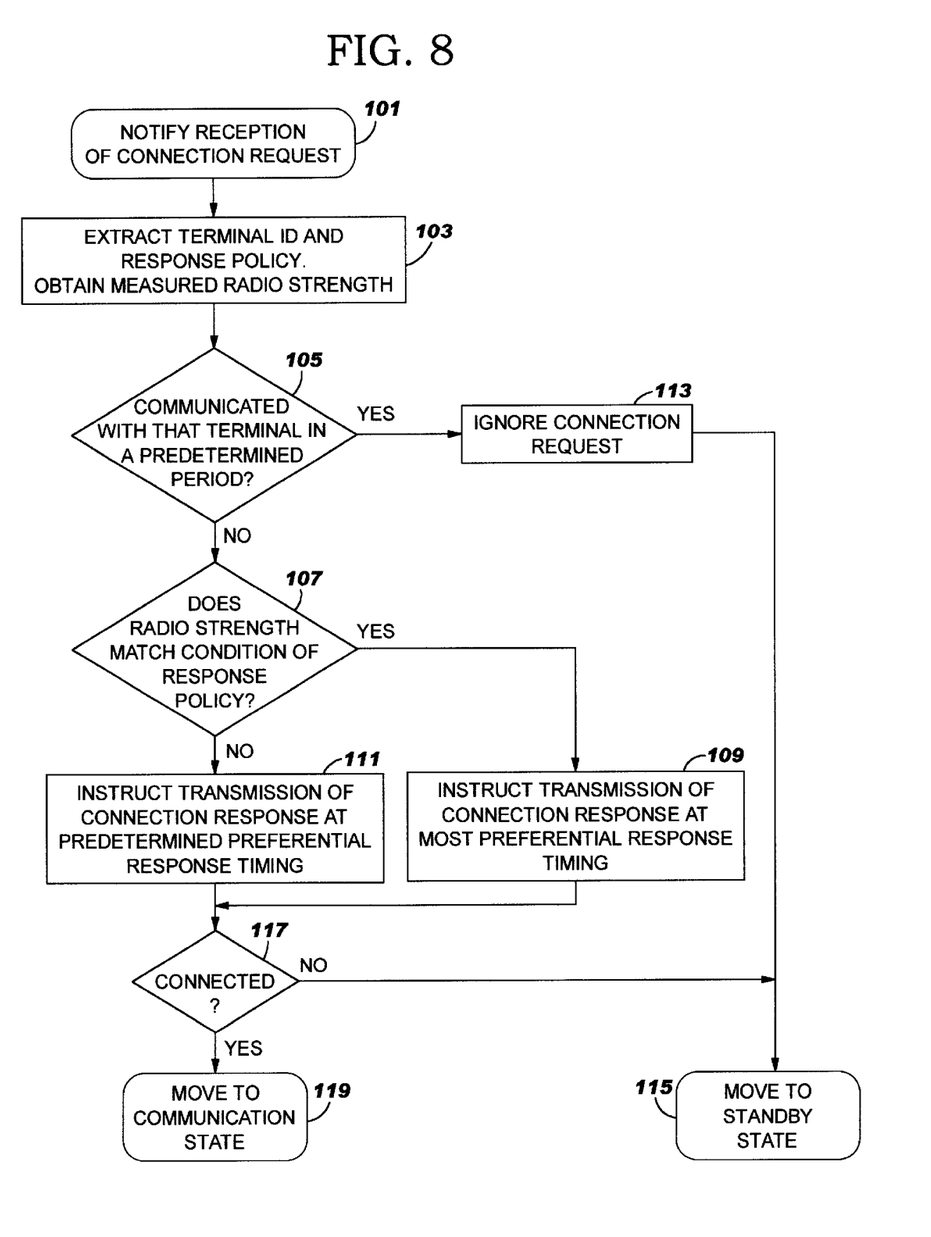
FIG. 8 is a flowchart showing the processing performed by the communication controller of the reception terminal.

An explanation will again be given, referring to FIG. 8, of the processing performed by the communication controller 7B at steps (6) to (9) in FIG. 6 and at steps (8') and (9') in FIG. 7. When at step (6) in FIG. 6 the communication controller 7B is notified that a connection request has been received (step 101), the controller 7B extracts the terminal ID and the response policy from the connection request and obtains the radio strength that is measured for the connection request (step 103, or step (7) in FIG. 6). Then, the communication controller 7B refers to the communication history to determine whether the reception terminal has communicated with the transmission terminal within a predetermined period of time (step 105). If the communication history shows that the reception terminal communicated with the transmission terminal within the predetermined period of time, the communication controller 7B outputs a notification to ignore the connection request (step 113, or step (8) in FIG. 6). The reception terminal is then returned to the standby state (step 115, step (9) in FIG. 6).

When the communication history does not show that the reception terminal communicated with the transmission terminal within a predetermined period of time, the communication controller 7B determines whether the measured radio strength matches the condition of the response policy (step 107). As described above, the available range of the radio strength can be divided into a plurality of levels in advance, and a specific level can be designated in the response policy. Further, a specific value range may also be designated. For example, such a range can be divided into three levels as follows.

If the level of the radio strength is low;
   The level of the response policy is "low": priority 1 for response timing (two seconds)
   The level of the response policy is "intermediate": priority 2 for response timing (four seconds)
   The level of the response policy is "high": priority 3 for response timing (six seconds)
If the level of the radio strength is intermediate;
   The level of the response policy is "low": priority 2 for response timing (four seconds)
   The level of the response policy is "intermediate": priority 1 for response timing (two seconds)
   The level of the response policy is "high": priority 2 for response timing (four seconds)
If the level of the radio strength is high;
   The level of the response policy is "low": priority 3 for response timing (six seconds)
   The level of the response policy is "intermediate": priority 2 for response timing (four seconds)
   The level of the response policy is "high": priority 1 for response timing (two seconds)

The conditions of the response policies are divided into three levels, and the measured radio strength is also divided into three levels in accordance with the same or similar references, so that the response policy can be compared with the radio strength. If the radio strength matches the condition of the response policy, the communication controller 7B instructs the transceiver 3B to transmit a connection response at the most preferential response timing (step 109). Specifically, this step is performed in a case where the radio strength is low and a response policy which indicates low is designated, in a case where the radio strength is intermediate and a response policy which indicates intermediate is designated, and in a case where the radio strength is high and a response policy which indicates high is designated. If the radio strength does not match the condition of the response policy, the communication controller 7B instructs the transceiver 3B to transmit a connection response at a predetermined preferential response timing (step 111). In this manner, the response timings are delayed, and a connection is established between the reception terminal that first transmitted a connection response and the transmission terminal. Although the response policy is low and the measured radio strength is intermediate, if there is no terminal located at a distance where the relative radio strength is determined to be low, a connection may be established. Upon receiving from the transceiver 3B a notification that a connection has been established (step 117), the communication controller 7B is shifted to the communication state (step 119). If the communication controller 7B is not notified that a connection has been established, it is shifted to the standby state (step 115).

An explanation has been given for the method that is used by the reception terminal to control the transmission of a response in accordance with the response policy and the communication history. In this embodiment, the reception is controlled in response to a request from the transmission terminal. However, the response policy can be determined by the reception terminal. That is, the response policy may be stored in advance in the memory 9B, and the response timing may be adjusted in accordance with the radio strength obtained by the radio strength measurement device 5B. This can be applied when the transmission terminal does not transmit the response policy.

A description will now be given for the method used by the transmission terminal when determining a response policy. The employment of a fixed response policy is the easiest method. For example, the terminal A will always designate a response policy which indicates "high", and the terminal B will employ a response policy which indicates "low." It should be noted that the response policy can be dynamically changed as follows.

(a) Change Due to Time

For a terminal having a timer, its response policy can be changed in accordance with the time. For example, a response policy which indicates low may be designated for commutation times extending from 8:00 to 10:00 and from 17:00 to 19:00, a response policy which indicates high may be designated for a communication time extending from 19:00 to 8:00 the next day, and a response policy which indicates intermediate may be designated for all other time periods.

(b) Terminal Having a Position Detector

When a terminal has a position detector, such as a GPS, and a map in which areas are divided in advance, these means can be employed to change the response policy. For example, a response policy which indicates low may be designated when a transmission terminal is in the vicinity of a station, a response policy which indicates high may be designated for a residential area, and a response policy which indicates intermediate may be designated for an area for which no particular status is specified.

(c) Combination of (a) and (b)

A connection between terminals may not be established, even in the vicinity of a station, unless a response policy which allows the connection is present. Therefore, a response policy is designated both (b) for an area and (a) for the time, so that it can be designated more in detail.

(d) Others

While a reference response policy is determined for each terminal, changing of the response policy can be performed in accordance with a predetermined pattern after a predetermined period of time. For example, when a response policy which indicates low is used as the reference, a [low, intermediate, low, high] pattern may be repeated; when a response policy which indicates intermediate is used as the reference, a [intermediate, low, intermediate, high] pattern may be repeated; and when a response policy which indicates high is used as the reference, a [high, low, high, intermediate] pattern may be repeated. Also, the response policy can be determined by using a random number, or can be changed in response to an instruction by a user. Furthermore, the response policy can be dynamically changed by the reception terminal which determines the response policy.

In conclusion, the following information is stored as terminal profiles in the memories 9 of the individual terminals:

[terminal mode]: transmission only/both transmission and reception

[response policy]: designation of the radio strength level, or an available range of the radio strength value

[hop pattern]: fixed/changeable

The communication controller 7 refers to the terminal profile, and the transmission terminal prepares a connection request. As described above, the reception terminal can employ the information for the terminal profile. It should be noted that either "reception only" or "both transmission and reception" may be selected as the terminal mode if the terminal mode is specified in the reception terminal.

The embodiment of the present invention has been described, but various modifications are possible. In this embodiment, the communication history is employed to determine whether a connection response should be transmitted. However, instead of the communication history, only the response policy may be employed to control a response timing. A terminal such as a PHS telephone terminal may serve as the terminal shown in FIG. 4. In this case, the mode for performing the present invention and the normal phone mode are so provided that communication can be performed only by a terminal that is set in the mode for performing the present invention. While the radio strength has been employed in the above description, another property of a radio signal can be measured and employed. For example, the error rate can be employed.

A combination of the conventional techniques can also be employed. For example, while the number of hops is specified in the information to be transmitted, a function may be provided for reducing the number of hops each time information is transmitted, and for discarding the information when the number of hops reaches 0. Furthermore, if a terminal includes a position detector such as a GPS, a scheme can be employed for calculating the distance to an information source and for discarding the information if the terminal is located outside a predetermined distance. In addition, not only a mobile terminal, but also a fixed terminal can perform the above described processing.

As described above, since a connection between mobile stations can be managed in accordance with the radio strength and the designated response policy, a method having a more adequate form can be provided for controlling the transmission of information. Further, congestion of information to be transmitted can be avoided. In addition, information can be transmitted more efficiently.

What is claimed is:

1. A method for determining, in a first mobile wireless transceiver, a response to a radio signal received from a second mobile wireless transceiver, said method comprising the steps of:

measuring a radio strength of said radio signal;

determining a response timing to the received radio signal using the measured radio strength and a response policy concerning the radio strength;

checking a communication history with said second wireless transceiver that has transmitted said radio signal; and, if said communication history shows that within a predetermined period of time there is a communication with said second wireless transceiver, determining that no response to said radio signal will be sent.

2. A mobile wireless transceiver comprising:

a measurement device for measuring a radio strength of a radio signal received from a certain mobile wireless transceiver;

a controller for determining a response timing to the received radio signal by using the measured radio strength and a response policy concerning the radio strength;

wherein said controller checks a communication history with said certain mobile wireless transceiver that has transmitted said radio signal, and if said communication history shows that within a predetermined period of time there is a communication with said certain mobile wireless transceiver, said controller determines that no response to said radio signal will be sent.

3. A method for determining, in a first wireless transceiver, a response to a radio signal received from a second wireless transceiver, said method comprising the steps of:

measuring a radio strength of said radio signal;

determining a response timing to the received radio signal using the measured radio strength and a response policy concerning the radio strength;

checking a communication history with said second wireless transceiver that has transmitted said radio signal; and, if said communication history shows that within a predetermined period of time there is a communication with said second wireless transceiver, determining that no response to said radio signal will be sent.

4. A wireless transceiver comprising:

a measurement device for measuring a radio strength of a radio signal received from a certain wireless transceiver; and, a controller for determining a response timing to the received radio signal by using the measured radio strength and a response policy concerning the radio strength, wherein said controller checks a communication history with said certain wireless transceiver that has transmitted said radio signal, and if said communication history shows that within a predetermined period of time there is a communication with said certain wireless transceiver, said controller determines that no response to said radio signal will be sent.

* * * * *